No. 790,015. PATENTED MAY 16, 1905.
H. C. H. WALSH.
PITMAN FOR DIE PRESSES.
APPLICATION FILED NOV. 16, 1903. RENEWED MAR. 30, 1905.

Witnesses:
H. S. Gaither
Fred G. Fischer

Inventor:
Harry C. H. Walsh
by Burton & Burton
his attorneys.

No. 790,015. Patented May 16, 1905.

UNITED STATES PATENT OFFICE.

HARRY C. H. WALSH, OF CHICAGO, ILLINOIS, ASSIGNOR TO CONSOLIDATED PRESS AND TOOL COMPANY, OF CHICAGO, ILLINOIS, A CORPORATION OF ILLINOIS.

PITMAN FOR DIE-PRESSES.

SPECIFICATION forming part of Letters Patent No. 790,015, dated May 16, 1905.

Original application filed August 20, 1903, Serial No. 170,107. Divided and this application filed November 16, 1903. Renewed March 30, 1905. Serial No. 252,916.

*To all whom it may concern:*

Be it known that I, HARRY C. H. WALSH, a citizen of the United States, residing at Chicago, in the county of Cook and State of Illinois, have invented new and useful Improvements in Pitmen for Die-Presses, of which the following is a specification, reference being had to the accompanying drawings, forming a part thereof.

This application is a division of my application No. 170,107, filed August 20, 1903.

The invention herein shown relates to certain improvements in the construction and operation of die-presses to facilitate the vertical adjustment of the upper or reciprocating die-holder.

It consists in the features of construction which are set out in the claims.

In the drawings, Figure 1 is a front elevation of a die-press embodying my invention with the lower portion of the supports or standards broken away. Fig. 2 is a detail section at the line 2 2 on Fig. 1, on a larger scale. Fig. 3 is a detail section at the line 3 3 on Fig. 2.

The reciprocating head 1 is operated in the vertical guideways 2 2 by a pitman 3, connected to the eccentric wrist 4 of the main shaft 5 between the two bearings 6 6, which said shaft obtains in the upper end of the jaw-frame 7. The lower end of this pitman is connected with the reciprocating head by a ball-and-socket joint, the ball 8, which terminates the pitman, being retained in a two-part socket in the upper end of the head, of which the upper part is the annular element 9, which is screwed into the upper end of the head to afford the upper half of the socket for retaining the ball. This annular element has a flange provided with apertures 10 for a spanner-wrench, with which it may be adjusted to compensate for any wear or to take up any looseness which may arise in the joint, a clamp-screw 11 being provided, as seen in Fig. 2, to clamp the thread and secure it against accidental slacking. This terminal ball is most conveniently made in a separate piece from the remainder of the pitman and secured thereto by having its stem 12 screwed into the lower end of the intermediate element or coupling 13 and made as secure as if it were integral therewith by being screwed up tight to the shoulder 14. The upper element 15 of the pitman is pivoted, by means of a suitable journal-box, on the eccentric wrist 4, as stated, and has a threaded stem 16, which screws into the upper end of the coupling 13, and a jam-nut 17 is provided on said stem at the upper end of the coupling. Projecting from the upper end of the coupling there is a pin 18, which takes into a slot 19 in the lower face of the jam-nut 17, said slot extending through an arc sufficient for the release of the nut from its jamming action on the end of the coupling. Both the jam-nut and the coupling are provided with suitable apertures 20 for a spanner-wrench or equivalent tool, so that the jam-nut may be slacked by rotation to the extent of the slot 19, and the further rotation in the direction for slacking will carry the coupling and cause it to be screwed up on the stem 16 to lift the reciprocating head, and the rotation of the coupling in the opposite direction, which may be done by the spanner engaging the coupling itself in the lower series of apertures 20, will screw the coupling down on the stem and lower the reciprocating head. The accurate adjustment of the reciprocating head for adjusting the punch or die carried thereby with respect to a die in the fixed bed can thus be made quickly and readily at any time when the fly-wheel is not rotating the shaft.

I claim—

1. In a die-press, in combination with a reciprocating head, an operating-shaft having an eccentric wrist; a pitman connecting the head to the wrist comprising two elements, one connected to the head and the other to the wrist, both connected together for longitudinal adjustment by a threaded joint; the element which makes the connection of the pitman with the head being the exterior element and being adapted to permit its rotation about the axis of said threaded joint for adjustment thereat.

2. In a die-press in combination with a reciprocating head; an operating-shaft having an eccentric wrist; a pitman connecting the head to the wrist comprising two elements, one connected to the head and the other to the wrist, both connected together for longitudinal adjustment by a threaded joint; and a third element corresponding to one of the two elements of said joint for jamming the same; the said third element and the corresponding element of said joint being adapted to permit a limited range of relative movement of said two parts, and having each means for engaging them for rotation.

3. In a die-press, in combination with a reciprocating head, a pitman for connecting the operating-shaft with the reciprocating head consisting of two elements connected together for longitudinal adjustment by a threaded joint; a jam-nut for securing such joint, said nut and the adjacent female element at said joint having the one a pin and the other a slot in an arc about the axis of the joint to receive the pin to permit a limited range of relative rotation of said adjacent parts, said jam-nut and said adjacent element having each means for engaging them for rotation.

In testimony whereof I have hereunto set my hand, in the presence of two witnesses, at Chicago, Illinois, this 11th day of November, A. D. 1903.

HARRY C. H. WALSH.

In presence of—
   CHAS. S. BURTON,
   FRED G. FISCHER.